(12) United States Patent
Chou

(10) Patent No.: US 6,339,374 B1
(45) Date of Patent: Jan. 15, 2002

(54) RECEIVING INDICATION APPARATUS FOR E-MAIL

(75) Inventor: Chin-Wen Chou, Taipei (TW)

(73) Assignee: Shin Jiuh Corporation, Taipei Hsien (TW)

( * ) Notice: Subject to any disclaimer, the term of this patent is extended or adjusted under 35 U.S.C. 154(b) by 0 days.

(21) Appl. No.: 09/712,961

(22) Filed: Nov. 16, 2000

(51) Int. Cl.[7] .............................................. G08B 21/00
(52) U.S. Cl. ............... 340/540; 340/825.36; 340/815.4; 345/1.1; 345/168
(58) Field of Search .............................. 340/540, 573.1, 340/384.7, 568.1, 384.1, 825.45, 825.36, 815.4, 815.45, 815.47, 815.79; 361/681; 345/317–961, 156–172, 1.1, 618; 341/20–35

(56) References Cited

U.S. PATENT DOCUMENTS 5,355,279 A * 10/1994 Lee .............................. 361/681
5,572,250 A * 11/1996 Lipton .......................... 348/43
6,144,363 A * 11/2000 Alloul ......................... 345/117

* cited by examiner

Primary Examiner—Jeffery Hofsass
Assistant Examiner—Anh La
(74) Attorney, Agent, or Firm—Bacon & Thomas

(57) ABSTRACT

A receiving indication apparatus for E-mail located in a keyboard or mouse device for indicating E-mail being received in a computer. The apparatus includes a signal output contact located in a microprocessor installed in the keyboard and a load linked to the signal output contact. When the computer receives E-mail and notifies the microprocessor, the signal output contact immediately outputs a driving signal to actuate the load for alerting user so that user may process the E-mail immediately without the need to stare at the display screen or shut down part of the programs.

7 Claims, 3 Drawing Sheets

RECEIVING INDICATION APPARATUS FOR E-MAIL

BACKGROUND OF THE INVENTION

This invention relates to a receiving indication apparatus for E-mail and particularly an indication apparatus that is capable of alerting users immediately upon receiving E-mail without the need for the users to stare at the display screen or shut down part of the programs.

Nowadays computers have been widely used in word processing, drawings and animation production, or controlling various types of machines to perform a variety of operations. Some people use the computer to access the Internet for reading information, issuing orders, downloading data, or receiving and delivering E-mail.

Conventional software in the computer for receiving and delivering E-mail usually shows a notice on the display screen or triggers an audio signal to alert the user when E-mail is being received for the user to process the E-mail immediately. However there are occasions in which the user is not able to get the notice of receiving E-mail. The main causes for such occasions include a display screen protection program has been equipped, a display screen power saving function has been activated, no audio output features, and a full screen program has been activated (for instance, to run a DVD player program). In such a situation, important or urgent E-mail could be missed or delayed, and may result in serious consequences for the user.

SUMMARY OF THE INVENTION

It is an object of this invention to resolve the aforesaid disadvantages by providing a receiving indication apparatus for E-mail so that the user will be alerted when E-mail is being received without the need for the user to stare at the display screen constantly or shut down part of the programs.

It is another object of this invention to provide a receiving indication apparatus for E-mail that has high feasibility, low cost and high practicality.

For achieving the objects set forth above, the receiving indication apparatus according to this invention includes a signal output contact located in the microprocessor of the keyboard and a load linked to the signal output contact. When the computer receives E-mail and notifies the microprocessor, the signal output contact immediately outputs a driving signal to activate the load for alerting the user. Hence the user may read and process E-mail immediately without the need to stare at the display screen or shut down part of the programs.

BRIEF DESCRIPTION OF THE DRAWINGS

The invention, as well as its many advantages, may be further understood by the following detailed description and drawings, in which.

DETAILED DESCRIPTION OF THE PREFERRED EMBODIMENT

Figure 1A:
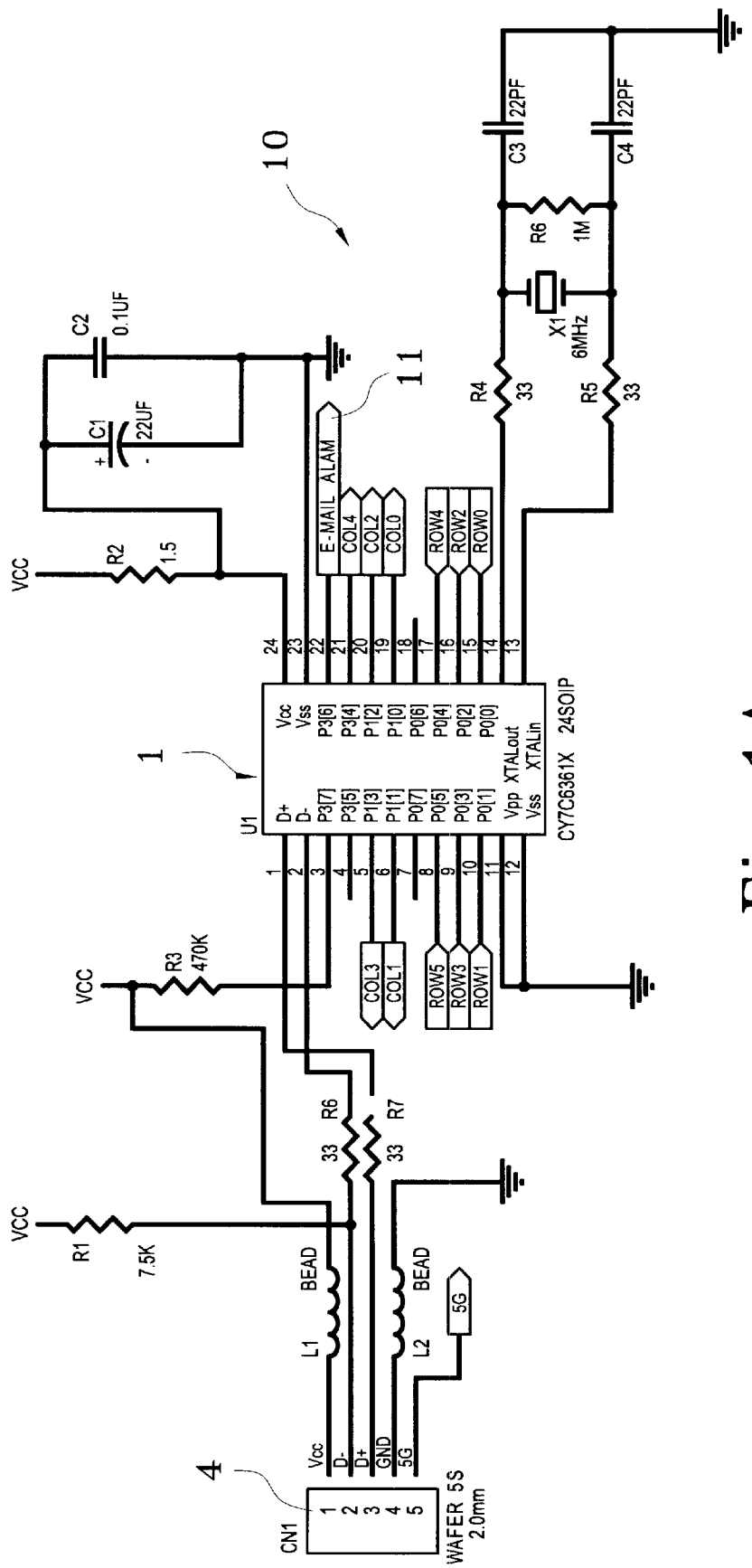
FIG. 1A is a schematic circuit diagram of this invention.
Figure 1C:
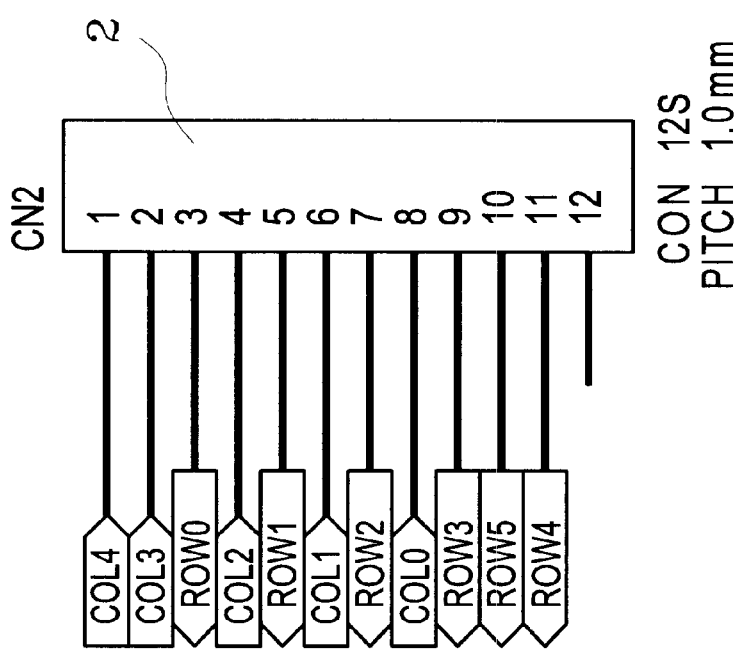
FIG. 1C is another fragmentary view of the schematic circuit diagram of this invention, according to FIG. 1A.
Figure 1B:
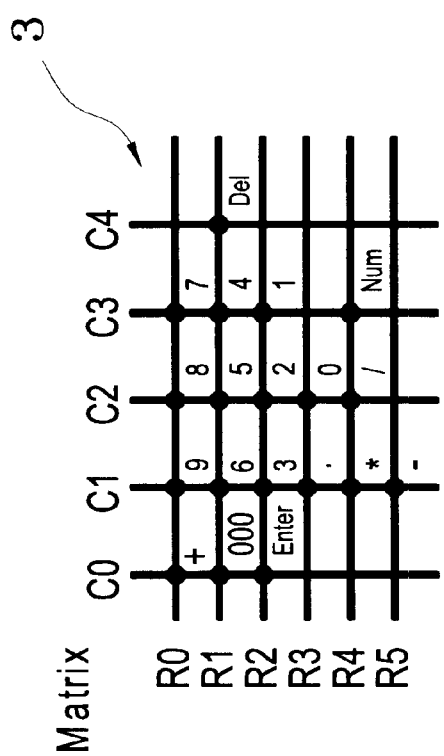
FIG. 1B is a fragmentary view of the schematic circuit diagram of this invention, according to FIG. 1A.

Referring to FIGS. 1A, 1B and 1C, the receiving indication apparatus for E-mail according to this invention is installed in a keyboard or mouse device. When a user's computer (such as a 10 desktop computer, notebook computer, handheld computer or the like) receives E-mail, the user will be alerted immediately for reading and processing without the need to stare at the display screen or shut down part of the programs.

The keyboard 10 (or mouse device) has circuits located therein which include a microprocessor 1, a second connector 2 linking with the microprocessor 1, a matrix unit 3 linking with the second connector 2, and a first connector 4 linking with the microprocessor 1 for transmitting data between the microprocessor 1 and the computer (not shown in the figures). The construction and function of the circuits in the keyboard 10 is known in the art, thus will be omitted herein.

The receiving indication apparatus of this invention includes a signal output contact 11 and a modified software and driver program. The output end (i.e. signal output contact 11) of the apparatus connects with a display device (not shown in the figures) or output unit (not shown in the figures) which forms a load of this invention. When the computer receives E-mail and notifies the microprocessor 1, the signal output contact 11 immediately outputs a driving signal to activate the display device or output unit for alerting the user.

The driving signal is a recognition code output by the driver program for activating the display device or output unit linked with the signal output contact 11, so that user will be alerted for processing the received E-mail immediately without the need to stare at the display screen or shut down part of the programs.

Figure 2:
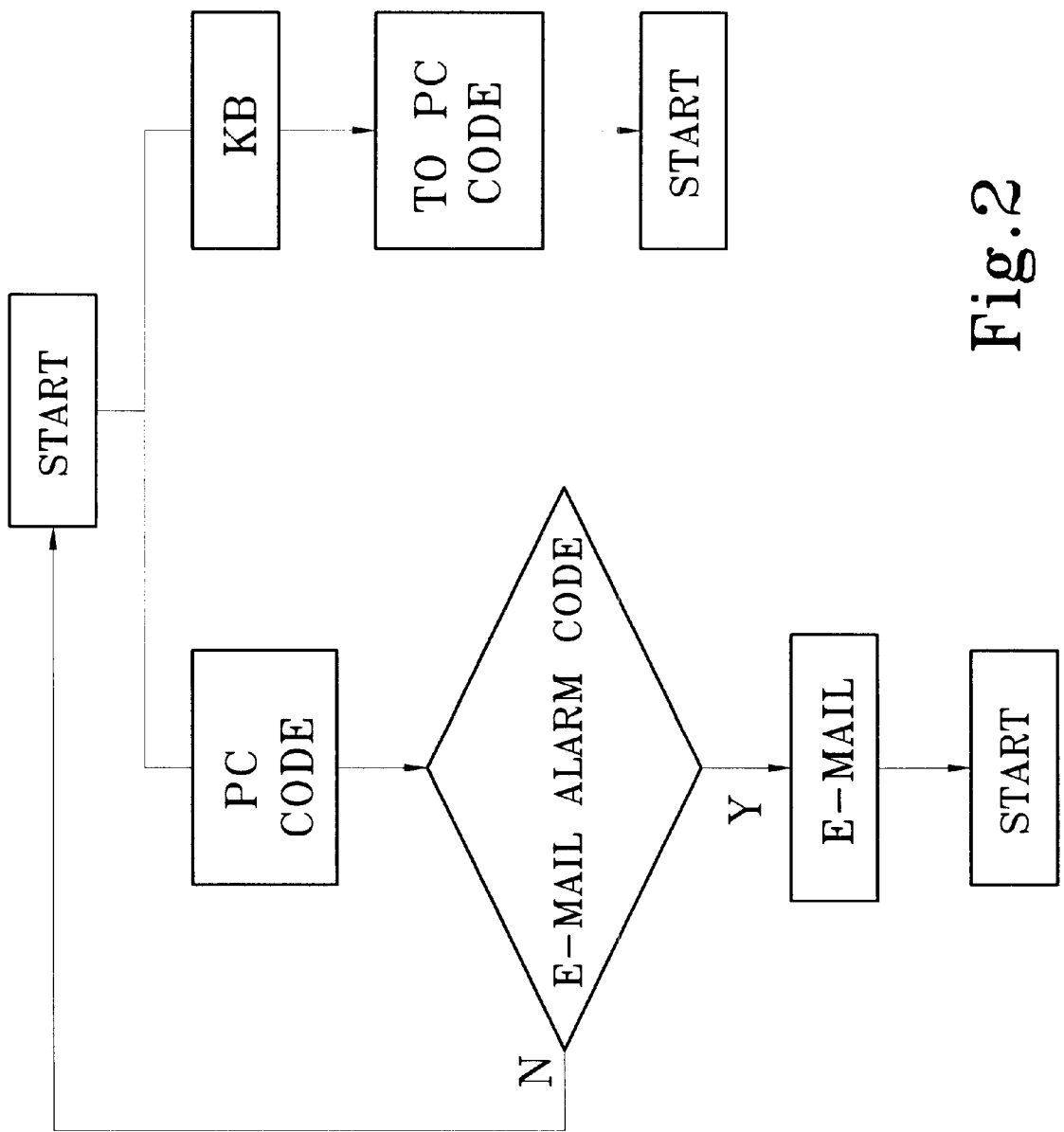
FIG. 2 is a software control process flow according to this invention.

FIG. 2 shows the software control process flow of this invention. When the computer is power-on, the keyboard 10 will be scanned and matched against the corresponding code in the computer for enabling the keyboard 10. When the keyboard 10 receives the computer code transmitted from the computer, the software will determine if the receiving code is an E-mail ALARM code. If the outcome is negative, the keyboard 10 will maintain the original operation state. If the outcome is positive, an E-mail recognition code will be output and sent to the display device or output unit. User then may process the E-mail immediately.

Furthermore, the display device according to this invention may be, but not limit to, a light emitting diode (may be an existing or an additional light emitting diode in the keyboard), or a light bulb. When the computer receives E-mail, the recognition code output from the microprocessor will actuate the light emitting diode or light bulb to light or flash, or produce audio signal from a speaker which may be used as an output unit. The speaker may be an existing speaker of the computer or an additional speaker.

What is claimed is:

1. A receiving indication apparatus for E-mail for installing in a keyboard or mouse device which has circuits located therein which include a microprocessor, a second connector linked with the microprocessor, a matrix unit linked with the second connector, and a first connector linked with the microprocessor, the apparatus comprising:

a signal output contact located in the microprocessor, and a load linked with the signal output contact, wherein when a computer receives an E-mail and notifies the microprocessor, the signal output contact immediately outputs a driving signal to actuate the load to alert a user for the user to process the E-mail immediately without the user staring at a display screen or shutting down part of programs.

2. The receiving indication apparatus for E-mail according to claim 1, wherein the computer is selectively a desktop computer, a notebook computer or a handheld computer.

3. The receiving indication apparatus for E-mail according to claim 1, wherein the driving signal is a recognition code.

4. The receiving indication apparatus for E-mail according to claim 1, wherein the load is selectively a display device or an output unit.

5. The receiving indication apparatus for E-mail according to claim 4, wherein the display device is selectively a light emitting diode or a light bulb.

6. The receiving indication apparatus for E-mail according to claim 5, wherein the light emitting diode is selectively a diode existing in the keyboard or an additional diode to the keyboard.

7. The receiving indication apparatus for E-mail according to claim 4, wherein the output unit is a speaker existing in the computer or an additional speaker to the computer.

* * * * *